United States Patent [19]
Ovard et al.

[11] Patent Number: 5,896,060
[45] Date of Patent: Apr. 20, 1999

[54] DPSK DEMODULATOR WHICH MAY BE USED IN AN INTERROGATOR OF A REMOTE INTELLIGENCE COMMUNICATION SYSTEM

[75] Inventors: David K. Ovard, Meridan; George E. Pax, Boise, both of Id.

[73] Assignee: Micron Technology, Inc., Boise, Id.

[21] Appl. No.: 08/893,368

[22] Filed: Jul. 15, 1997

Related U.S. Application Data

[XX .
[60] Provisional application No. 60/033,829, Dec. 23, 1996.
[51] Int. Cl.⁶ .............................. H03D 3/00; H04L 27/22
[52] U.S. Cl. ......................... 329/304; 375/324; 375/330
[58] Field of Search .................................. 329/304–310;
375/324–328, 329–333

[56] References Cited

U.S. PATENT DOCUMENTS 5,311,555  5/1994  Ichiyoshi ................................. 329/304

*Primary Examiner*—David Mis
*Attorney, Agent, or Firm*—Nixon & Vanderhye P.C.

[57] ABSTRACT

A differentially phase shift keyed demodulator for use in an interrogator of a remote intelligent communication system. The demodulator includes a quadrature combiner delaying one of the quadrature signals and thereafter combining the delayed and undelayed signals along with a FIR matched filter, which filters the combiner output whereby the differentially phase shift keyed data on a sub-carrier can be demodulated using a simple delay and multiplying scheme in response to the filtered output.

16 Claims, 13 Drawing Sheets

5,896,060

DPSK DEMODULATOR WHICH MAY BE USED IN AN INTERROGATOR OF A REMOTE INTELLIGENCE COMMUNICATION SYSTEM

RELATED APPLICATIONS

This application is related to provisional application Ser. No. 60/033,829 filed Dec. 23, 1996 for which priority pursuant to 35 USC 119(e) is claimed.

FIELD OF THE INVENTION

The presently disclosed subject matter relates to differential phase shift keyed demodulators for use in an interrogator in a remote intelligent communication system.

BACKGROUND OF THE INVENTION

In a remote intelligent communication system 2, with reference to FIG. 1, a host computer 10 communicates across a given communication medium 18 with a selected remote intelligent communications device $14_1$, for example, a plurality of remote intelligent communication devices $14_0$, $14_1$, $14_2$. An interrogator 12 is employed intermediate the host computer 10 and communications medium 18 for appropriately coupling the host computer to the medium. Host computer 10 has a library of commands 11 available for configuring and operating the interrogator 12, the remote intelligent communications device 14, and itself.

In an exemplary application, host computer 10, via appropriate programming, retrieves appropriate commands from within its library of commands 11 and sends associated command data to interrogator 12 by way of a digital interfacing link 16. Digital interfacing link 16 is an enhanced parallel port (EPP) digital interface. The command forwarded from host 10 to interrogator 12 can be a command for configuring the interrogator, a command for operating interrogator 12, or a command for configuring or operating a remote intelligent communications device 14.

Upon receiving the command, interrogator 12 configures itself appropriately in accordance with the command instructions and/or forwards appropriate data along a forward RF communications link 18 to a remote intelligent communications device 14. Depending upon the type of command, the remote intelligent communications device 14 may respond with an appropriate return RF transmission 18. If such a reply is received, interrogator 12 extracts digital data from the RF reply signal and forwards the reply message to host computer 10 for further analysis.

Remote intelligent communications device 14 may comprise an Ambit™ remote intelligent communications device, available from Micron Communications Inc. of Boise, Id.

Interrogator 12 receives digital data by way of digital interfacing port 16, which may be an enhanced parallel port. Certain commands of the "Micron RFID Library" 11 are associated with configuring interrogator 12. For example, interrogator 12 may receive a command for structuring appropriate transmit and receive antenna structures. In this regard, a receive antenna structure may include two or more separate antennas selectively configurable for receiving an RF signal. Likewise, transmitting antennas are selectively configurable for enabling two or more transmissions of RF signals away from interrogator 12. Moreover, diversity switches of the transmit and receiver communication paths are respectively configurable in accordance with configuration data received from a digital controller. The diversity switches configure the respective antenna structures of the receiver and transmitter communication links of interrogator 12.

Further details of the above-noted communication system can be found in co-pending commonly assigned application Ser. No. 08/656,530, which is hereby incorporated by reference in its entirety. Specifically, in a remote intelligent communication system, with reference to FIGS. 6 and 7, a host computer 110 communicates across a given communication medium 118 with a select remote intelligent communications device $114_1$ of a plurality of remote intelligent communication devices $114_0$, $114_1$, $114_2$. Typically, an interrogator 112 is employed intermediate host computer 110 and communications medium 118 for appropriately coupling host computer 110 to the medium 118. Preferably, host computer 110 has a library of commands 111 available for configuring and operating interrogator 112, remote intelligent communications device 114, and itself.

In an exemplary application, host computer 110, per appropriate programming, retrieves appropriate commands from within its library of commands 111 and sends associated command data to interrogator 112 by way of a digital interfacing link 116. Preferably, digital interfacing link 116 is an enhanced parallel port (EPP) digital interface. The command forwarded from host 110 to interrogator 112 can be a command for configuring the interrogator, or command for operating interrogator 112, or a command for configuring or operating remote intelligent communications device 114.

Upon receiving the command, interrogator 112 configures itself appropriately in accordance with the command instructions and/or forwards appropriate data along a forward RF communications link $118_1$ (as shown in FIG. 7) to remote intelligent communications device 114. Depending upon the type of command remote intelligent communications device 114 may respond with an appropriate return RF transmission $118_r$. If such a reply is received, interrogator 112 extracts digital data from the RF reply signal and forwards the reply message to host computer 110 for further analysis.

Host computer 110 may be a computer compatible with Microsoft DOS™ and may have a processor of performance equal to or greater-than an 80486™ processor. Preferably, host computer 110 has an enhanced parallel port (EPP) for providing a digital interface 116 with interrogator 112. A library of commands for operating interrogator 112 and remote intelligent communication devices 114, are available in a software tool "Micron RFID Library (MRL)" available from Micron Communications, Inc. of Boise, Id. "Micron RFID Systems Developer's Guide", version 3.1, May 9, 1996, of Micron Communications, Inc. of Boise, Id., provides a user's guide for identifying software commands available within the MRL software tools, and how to employ such commands for configuring and operating a remote communications system.

In one embodiment, remote intelligent communications device 114 comprises an Ambit™ remote intelligent communications device, available from Micron Communications Inc. of Boise, Id. In alternative embodiment of the present invention, device 114 comprises a Microstamp™ remote intelligent communications device, also available from Micron Communications, Inc. of Boise, Id. In most instances, the commands for operating these two devices are essentially the same; differences therebetween are described in the aforementioned "Micron RFID Systems Developer's Guide".

With reference to FIG. 8, interrogator 112 receives digital data by way of digital interfacing port 116 (e.g., EPP). Certain commands of the "Micron RFID Library" are associated with configuring interrogator 112. For example, interrogator 112 may receive a command for structuring appropriate transmit and receive antenna structures. A receive antenna structure, in one embodiment of the present invention, includes two separate antennas $120_1$ and $120_2$ selectively configurable for receiving an RF signal. Likewise, transmitting antennas structures $122_1$ and $122_2$ are selectively configurable for enabling transmission of RF signals away from interrogator 112. Diversity switches 136, 138 of the transmit and receiver communication paths respectively are configurable in accordance with configuration data received by digital controller 124. The diversity switches configure the respective antenna structures of the receiver and transmitter communication links of interrogator 112.

Amplifier 140 receives an RF input signal from the receiver antenna structure 120 (via diversity switch 138) and forwards an amplified representation of the received RF signal to a down converter 142. Down converter 142 receives a local Oscillator (LO) signal from an internal frequency synthesizer 126 via power divider 128. The LO signal mixes with the received RF input signal for providing an intermediate frequency (IF) output (e.g., I and Q outputs for full quadrature demodulation) which is forwarded to demodulator 144. Demodulator 144 demodulates the IF signal received from down converter 142 and recovers data therefrom in accordance with the modulation present on the IF Signal. Typically, digital controller 124 receives the recovered data and forwards it to host computer 110 by way of digital interface 116.

As part of a forward transmission chain, mixer 130 receives a carrier signal from frequency synthesizer 126 by way of power divider 128. The carrier signal is modulated in accordance with data established by digital controller 124. The resulting modulated output carrier is sent to amplifiers 132 and 134 for appropriate amplification before transmission to transmitter antenna structure 122 as selected in accordance with diversity switch 136. In one preferred embodiment, interrogator 112 is a 915 MHz backscatter interrogator, available from Micron Communications, Inc. of Boise, Id.

In the remote intelligent monitoring system depicted in FIG. 7, remote intelligent communications device 114 is associated with an automobile 115. However, in alternative applications, remote intelligent communications device 114 is associated with other animate or inanimate objects, including, but not limited to, luggage, a shipment package, an animal, a manufacturing assembly, a railway car, a water vessel, etc.

In the remote intelligent communications systems as described with reference to FIGS. 6 and 7, remote intelligent communications device 114 generally uses a line-of-sight RF path with reference to interrogator 112 in order to maintain integrity of the associated RF communications link 118 therebetween. Should obstacles or interference be encountered along the RF communication path, the communication link may be lost. In addition, transmission power limitations of interrogator 112 and remote intelligent communications device 114 can likewise affect the integrity of, and distal range available for, the RF communications link.

In accordance with one embodiment, an alternative modem link is provided between host computer 110 and remote intelligent communications device 114, as shown in FIG. 9. A modem 152 is coupled to host 110 via an appropriate modem interface 150. Preferably, interface 150 comprises an RS-232 data interface. Likewise, remote communications device 114 is coupled to another modem device 154 by way of an appropriate digital interface 156, preferably, an RS-232 compatible interface. Modem devices 152,154 are coupled appropriately therebetween by way of an appropriate modem interfacing channel 158, preferably establishing a "transparent" alternative interfacing solution between host 110 and remote intelligent communications device 114. The alternative modem interface is alternative to the normal RF communications link 118.

Interfacing medium 158 between modem devices 152 and 154 may comprise a wireless intercommunications medium, such as an alternative RF channel, an optical medium, or an acoustic medium. Modern devices 152,154 comprise appropriate wireless modem devices for communicating therebetween via the associated wireless medium. The interfacing medium 158 may comprise a cellular network, and modem devices 152 and 154 may be cellular modem devices for interfacing to a cellular network. Typically, the cellular modem devices and the cellular network employ analog cellular modulation technology for the communications link. Alternatively, and preferably, the cellular modem devices and cellular network employ a cellular digital packet technology that is more secure than an analog cellular communications link. Modem devices 152 and 154 may also be satellite modem devices for enabling communications therebetween by way of a satellite link 158. Examples of the above modem devices are available from Motorola, Inc. and other modem manufacturers.

The above modem devices enable alternative communications between host computer 110 and remote intelligent communications device 114 in accordance with the respective wireless, cellular, and satellite links. Thus, should a remote intelligent communications device 114 be carried beyond its normal operating range associated with RF communications link 118, or should undue RF interference be encountered within the normal RF communications link 118; the host computer can attain an alternative communicate link with remote intelligent communications device 114 by way of the alternative modem devices 152, 154. Preferably, modem devices 152, 154 and associated digital interfacing, provide a transparent RS-232 interfacing solution between host computer 110 and remote intelligent communications device 114.

The remote intelligent communications device 114 is shown in greater detail in FIG. 10. In particular embodiments, remote intelligent communications device 114 comprises a Microstamp™ remote intelligent communications device, or an Ambit™, remote intelligent communications device, both of which are available from Micron Communications, Inc. of Boise, Id. The block diagram of FIG. 10 is representative, generally, of both of the two different types of remote intelligent communication devices named above. However, differences do exist therebetween, a few of which will be explained hereinbelow.

With reference to FIGS. 10 and 11, normal RF communications with remote intelligent communications device 114 is established by way of an RF port 164. In one embodiment, RF port 164 comprises a single antenna structure. In an alternative embodiment, two separate antennas are used, e.g., one for receiving and a second for transmission. Typically, receiver 166 includes appropriate down conversion, filtering, amplification, and detection circuitry. Receiver 166 is coupled to the RF port 164 for receiving an input RF signal. Receiver 166 forwards an appropriately received RF input signal to a clock and data recovery circuit 168. Clock and data recovery circuitry 168 receives an output signal as output from receiver 166 and recovers appropriate data therefrom. Additionally, clock and data recovery circuitry 168 recovers a clock signal having a frequency related to, and edges in synchronization with, the recovered data. In one embodiment of the present invention, a recovered clock 176 is sent to output frequency modulator 170. Output modulator 170 provides a carrier signal of a frequency related to the frequency of the recovered clock and modulates the carrier signal in accordance with desired data for an appropriate output transmission. Alternatively, an output transmission from remote intelligent communications device 114 utilizes the input RF signal itself as a carrier signal source within an alternative "backscatter" mode of operation, which will be described more fully hereinbelow.

In a particular backscatter, antenna port 164 of remote intelligent communications device 114 includes a pair of conductive lines, forward and return conductive lines (not shown), as an input section to a dipole or loop antenna. To enable backscatter operation, a switching element (not shown) is coupled between the forward and return conductive lines of the antenna structure proximate the antenna interface to the remote intelligent communications device 114. When the selective switch is closed, the impedance characteristics of the associated antenna will be different in comparison to the impedance characteristics thereof when the switch is open. Preferably, when the selective switch is open, the antenna provides a matched impedance, presenting an appropriate termination impedance to avoid reflections of RF signals of a given frequency as incident to the remote intelligent communications device 114. On the other hand, when the switching element is closed, preferably the device provides a short, shorting the forward and return conductive lines. Accordingly, RF signals received at the RF input port are reflected rather than terminated by the remote intelligent communications device 114. By modulating the matched and reflective characteristics of the antenna structure, via the open/short characteristics of the selective switch, a reflective RF signal can be selectively provided. The carrier frequency of the reflected RF signal will correspond to the carrier frequency of the incident RF signal, while the amplitude modulation of the reflected RF signal is established in accordance with the opening and closing of the selective switch.

In one embodiment, the selective switch is a pin diode. Alternatively, the switching device is a Schottky diode, a bipolar transistor, or a FET transistor. The respective diode or transistor is functionally modulated in accordance with data to be sent out from remote intelligent communications device 114, i.e. the retrieved data.

Data recovered by the clock and data recovery circuitry 168 is forwarded as input data 174 to microcontroller 160. Input data 174 may comprise command data, in addition to associated configuration data or other forms of information. Microcontroller 160 interprets the input data appropriately for controlling operation of remote intelligent communications device 114. Such control may include configuration of desired digital ports 184, configuration of desired analog ports 186, partialing or allocation of memory 162, configuration of appropriate antenna structures at RF port 164, selection of desired input/output frequency channels, time duration and operation of wake up circuitry 186, and/or charging of, or distribution of current from, battery 183.

In addition, microcontroller 160 controls operation of alternative modem port 180 for selectively interfacing with the alternative modem device 154. Preferably, the interface between microcontroller 160 and modem 154 is an RS-232 digital interface. In such conditions, microcontroller 160 enables the alternative modem port for external communications, and configures (104 of FIG. 13) the alternative data modem for an appropriate baud rate, e.g. 2400, 4800, or 9600 bits per second.

One method of enabling and configuring modem 154 involves sending an appropriate command and accompanying configuration data to the remote intelligent communications device 114 by way of the primary RF interface 118. Microcontroller 160 interprets the command appropriately and enables the alternative modem port 180 by forwarding appropriate configuration data to an associated control register (not shown) within the remote intelligent communications device 114. Additionally, microcontroller 160 forwards the appropriate configuration data, as might be associated with the desired baud rate and appropriate communications protocol, to modem 154 for enabling proper communications with host 110.

Alternatively, remote intelligent communications device 114 may have select pins which can be hard-wired to an appropriate voltage potential, for example, ground or $V_{CC}$. Such that whenever the remote intelligent communications device 114 powers-up, microcontroller 160 senses the fixed hard wired pins and configures itself appropriately, enabling the modem port 160 and appropriately configuring modem device 154 in accordance with the condition of the hard-wired pins. Another method of providing a power tip configuration sequence comprises storing appropriate command and configuration data in nonvolatile memory within the remote intelligent communications device 114. At power-tip, the command data and appropriate configuration data are retrieved from the nonvolatile memory and executed accordingly by microcontroller 160 during a power-up configuration sequence.

In the above embodiment, the interface between the remote intelligent communications device 114 and modem device 154 was described as an RS-232 interface. In an alternative embodiment, the interface between modem 154 and remote intelligent device 114 comprises a serial data link and a synchronization clock line for sending data therebetween in synchronization with an appropriate clock signal.

In one exemplary embodiment of remote intelligent communications device 114, wake-up circuitry 182 senses when an appropriate RF input signal is received by receiver 166 and activates other portions of remote intelligent communications device 114 upon receiving a valid RF input signal and upon determining a valid interrogation protocol, compatible with the particular remote intelligent communications device 114. In an alternative embodiment of a remote intelligent communications device, wake-up circuitry 182 includes a self-timer that periodically forces an inquiry for determining the presence of an interrogation signal. When the self-timer times out at the end of a sleep mode, the wake-up circuitry 182 enables receiver 166 and clock and data recovery circuitry 168. Once these portions have been enabled, a further determination can be made as to whether or not a valid input signal is received. Upon determining a valid interrogation signal (per an appropriate interrogation protocol), the wake-up circuitry enables additional portions of the remote intelligent communications device 114 for full operation.

Battery 183 provides power to various elements of the remote intelligent communications device and is enabled appropriately by wake-up circuitry 182. During a sleep mode of operation, wake-up circuitry minimizes the amount of current drawn from battery 183. During alternative operating modes, wake-up circuitry 182 enables battery 183 to provide appropriated current flow to portions of remote intelligent communications device 114 as needed.

Additional information regarding a communication protocol between an interrogator 112 and a remote intelligent communications device 114 is available in U.S. Pat. No. 5,500,650, entitled "Data Communication Method Using Identification Protocol", issued Mar. 19,1996, filed Dec. 15, 1992, and U.S. Pat. No. 5,479,416, entitled "Apparatus and Method for Error Detection and Correction in a Radio Frequency Identification Device", issued Dec. 26, 1995, filed Sep. 30, 1993, which U.S. Patents are assigned to the assignee of the present invention and incorporated herein by reference in there entirety.

In a preferred exemplary embodiment, with reference to FIGS. 10–13, remote intelligent communications device 114 has a first digital interfacing port $184_1$ tied to a navigation receiver, e.g., a global positioning systems (GPS) receiver 188. GPS receiver 188 receives select GPS satellite information, by way of an appropriately tuned GPS antenna 189. An additional digital IO port $184_2$ is selectively coupled to other monitoring circuitry 194, such as: a "trip master"™ of a delivery truck as is available from Rockwell International Corp., a continuity tester for monitoring a door of a delivery truck, or an analog-to-digital device that provides digital information to the remote intelligent communications device 114 representative of an analog measurement signal being sampled thereby. Analog IO port $186_1$ is selectively coupled to a transducer 190 (or alternatively, an accelerometer 192) for receiving an analog measurement signal in accordance with an associated continuity, pressure, magnetic field, temperature, or acceleration as measured by the respective transducer. Microcontroller 160 controls the configuration of the digital and analog IO ports 184, 186 respectively, in accordance with appropriate command and configuration data.

Preferably, remote intelligent communications device 114 also includes a comparator 196, and/or an analog-to-digital converter 198, which comparator and converter are selectively enabled by the controller in accordance with associated command and configuration data. In a select configuration, comparator 196 receives the analog signal of analog port 186, and compares this analog signal against a predetermined reference voltage $V_{ref}$. Comparator 196 then triggers a flag (or an alarm) to microcontroller 160; signaling that the voltage received at analog port 186, is greater (or less) than the voltage $V_{ref}$. In an alternative select configuration, the analog signal received at analog port $186_1$ is coupled to the input analog-to-digital converter 198. The analog-to-digital converter receives the analog input signal and converts the signal into a digital signal, i.e., measurement data representative of the analog voltage. The digital signal is forwarded to microcontroller 160 or an appropriate digital bus.

In an exemplary application, with reference to FIG. 12, a remote intelligent communications device 114 is employed for monitoring an open/close condition of a door 1102 of a cargo bay 1100 of, for example, a delivery truck. A transducer 190 is configured with cargo bay 1100, proximate door 1102, for determining when door 1102 is opened or closed. For example, transducer 190 preferably comprises a magnetic transducer for sensing magnetic characteristics as may be associated with the opening/closing of door 1102. Transducer 190 produces an analog signal representative of the open/close condition, that is forwarded to analog port $186_1$ of remote intelligent communications device 114. Although transducer 190 is described as a magnetic transducer, transducer 190 in an alternative exemplary embodiment is a continuity monitor, as employed and disclosed in U.S. Pat. No. 5,406,263, entitled "Anti Theft Method for Detecting the Unauthorized Opening of Containers and Baggage", issued Apr. 11, 1995, assigned to the assignee of the present invention, and hereby incorporated by reference.

Remote intelligent communications device 114 is configured appropriately (1106 of FIG. 13) to monitor the input analog signal, perhaps via comparator 196, to determine when door 1102 has been opened. Upon determining a door opening microcontroller 160 records the condition appropriately. In accordance with one aspect of this embodiment, comparator sends an interrupt to microcontroller 160 upon sensing an excessive signal at the analog part $186_1$. Alternatively, microcontroller 160 examines analog port $186_1$ periodically and checks the condition or status of door 1102, as measured by transducer 190.

In addition to monitoring the condition of door 1102, remote intelligent communications device 114 can record (1106 of FIG. 13), per an appropriate configuration, information as received from a navigation receiver, such as GPS receiver 188, selectively coupled to digital port $184_1$. GPS receiver 188 receives GPS information by way of its GPS interconnect, e.g. antenna 189. Remote intelligent communications device 114 receives the GPS information and logs navigation data thereof into memory 162. In this fashion, coordinate information regarding a position of a delivery truck, i.e. cargo bay 1100, can be associated with respective openings and/or closings of door 1102. Subsequently, the stored measurement data as obtained by transducer 190, and stored coordinate data as obtained by navigation receiver 188, are retrieved from memory 162 and read (1108 of FIG. 13) by host 1110 via RF interconnect 118, or by way of an alternative modem communications channel as disclosed hereinbefore.

As data is read from the remote intelligent communications device 114, it is preferably accumulated (110 of FIG. 13) within host computer 110 for subsequent analysis. To assist this analysis, the accumulated measurement and coordinate data is imported into a given data analysis software tool. The data analysis tool provided can be a known spreadsheet analysis tool, such as, for examples, Excel™, Lotus™, Microsoft Access™, or similar available data analysis software tool. Alternatively, a custom data analysis program may be developed as suited for the particular remote monitoring application.

Appropriate macros are preferably developed, in a known fashion, for deriving meaningful conclusions or reports regarding the respective parameters retrieved from the remote interrogation communications device 114. In reporting (1112 of FIG. 13) the monitored characteristics, a graph or chart is preferably compiled in accordance with the derived conclusions and portrayed appropriately on a given display (or print medium) using known audio and/or visual multi-media tools.

In a preferred exemplary method, a particular measurement phenomenon, as monitored by a given remote intelligent communications device 114, is correlated with associated geographic position(s), time/date information, temperature, and/or other selective measurement event(s), in order to provide additional understanding of the particular measurement phenomenon. For example, when the particular measurement phenomenon concerns the opening or closing of a door, in can be correlated with an associated geographic position and/or time, for aiding determination of acceptable door opening/closing as opposed to an unacceptable door opening or closing. Furthermore, a temperature profile may be correlated with respective door openings and closings together with associated time intervals therebetween for determining excessive refrigeration or heating demands for temperature recovery. Thereafter, corrective actions may be taken as desired based upon the conclusions provided by the data analysis.

In the particular exemplary configuration disclosed above, transducer 190 is disclosed as a transducer external to remote intelligent communications device 114. Alternatively, a remote intelligent communications device may have an internal magnetic sensor associated therewith. The internal sensor can selectively monitor particular magnetic properties, as might be associated with door 1102.

In further aspects of the above exemplary application, remote intelligent communications device also includes: a temperature transducer for simultaneously monitoring temperature, an accelerometer for monitoring shipping stability (shock), or interfacing circuitry for obtaining additional information from a "trip master" of an associated carrier vehicle 1100. These various alternative input devices were described more fully hereinbefore with reference to FIG. 11.

SUMMARY OF THE INVENTION

The present invention pertains to a novel differential phase shift keyed demodulator an exemplary use for which is in an interrogator of a remote intelligent communication system of the above-noted type. In accordance with an exemplary embodiment, I and Q outputs are obtained from a quadrature downconverter which are converted to digital signals and input into a quadrature combiner operating at a single frequency sensed through the use of differential phase shift keyed modulation. Thus, there is only a single frequency present in the sub-carrier. Moreover, the use of the quadrature combiner is important in a backscatter communication system since the phase of the incoming signal is unknown. That is to say, it is impossible to predict whether the recovered signal will appear on the I or Q of the downconverter output. It is also not possible to predict whether the I and Q channels will be in or out of phase with one another. The use of the quadrature combiner eliminates these uncertainties since the output will be the same amplitude regardless of whether the signal is entirely on the I or Q channel or any combination of the two. Moreover, the single signal output is thereafter passed through a FIR matched filter having a square time envelope with taps at the sub-carrier frequency wherein tap values are all of the same magnitude, thus simplifying the implementation of the matched filter. Thereafter, demodulation can be obtained through the use of a simple delay and multiplication scheme.

BRIEF DESCRIPTION OF THE DRAWINGS

The above-noted and other features of the present invention will be better and more completely understood by studying the following detailed description of presently preferred embodiments together with the appended drawings, of which.

DETAILED DESCRIPTION OF PREFERRED EMBODIMENTS

Figure 1:
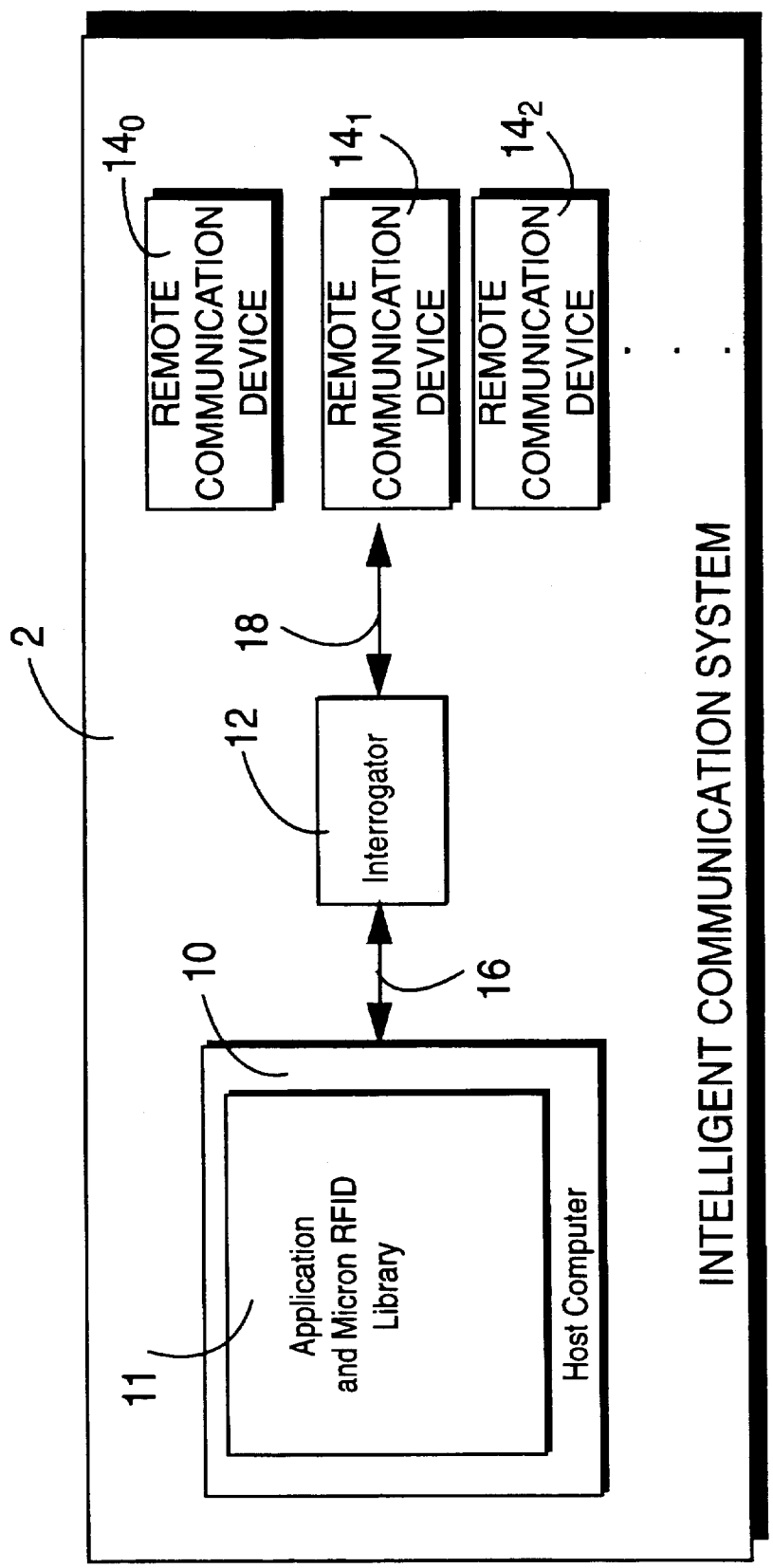
FIG. 1 is a simplified block diagram of a remote communications system for selectively communicating with a particular remote intelligent communication device.
Figure 2:
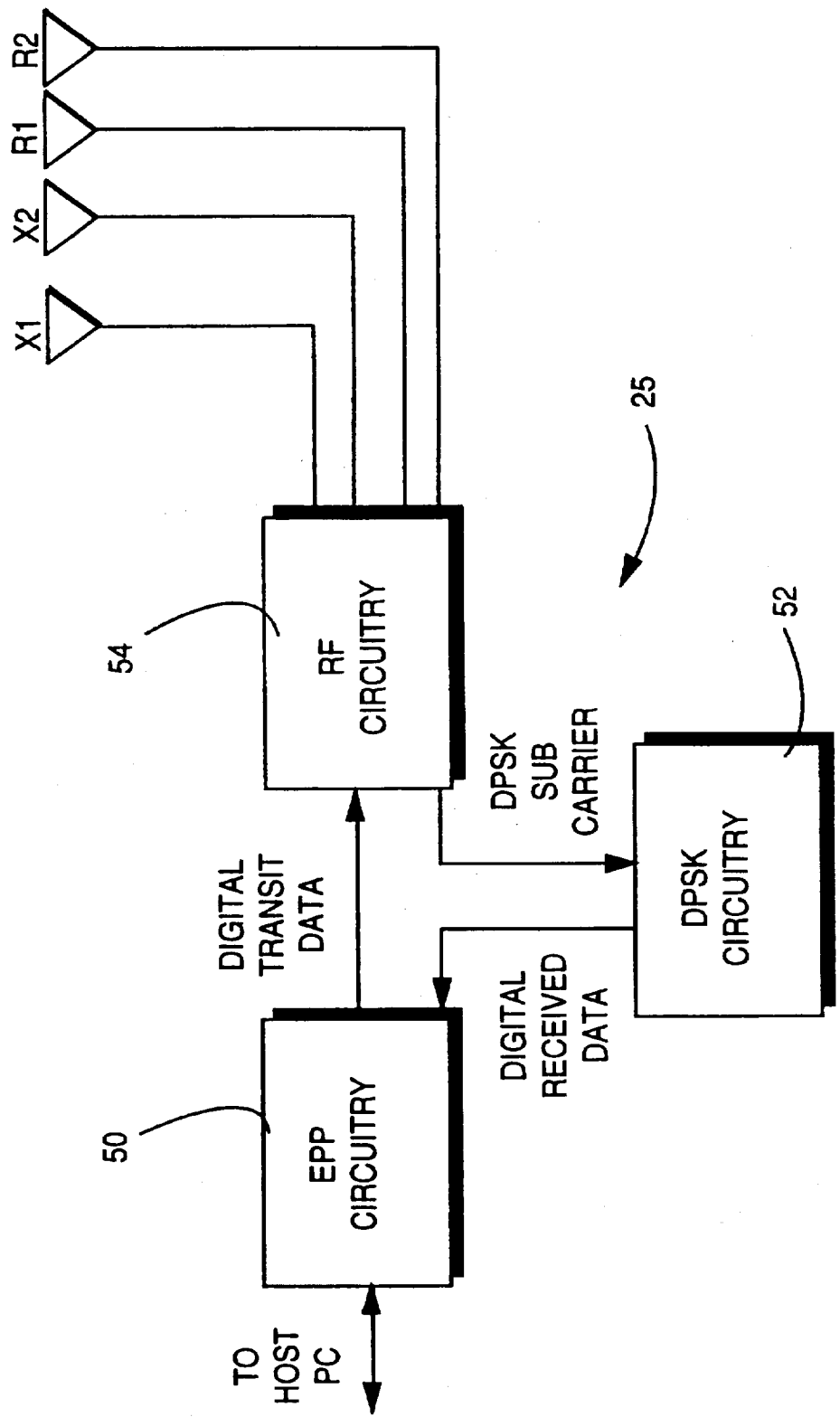
FIG. 2 is a simplified block diagram of an interrogator.

The interrogator 26 of FIG. 2, which may be used in a communications system as in FIG. 1, includes enhanced parallel port (EPP) circuitry 50, DPSK (differential phase shift keyed) circuitry 52, and RF (radio frequency) circuitry 54, as well as a power supply (not shown) and a housing or chassis (not shown). In the illustrated embodiment, the enhanced parallel port circuitry 50, the DPSK circuitry 52, and the RF circuitry 54 respectively define circuit card assemblies (CCAs). The interrogator uses an IEEE-1284 compatible port in EPP mode to communicate with the hose computer 48. The EPP circuitry 50 provides all the digital logic required to coordinate sending and receiving a message with a transponder 14. The EPP circuitry 50 buffers data transmitted from the host computer 10, converts the data to serial data, and encodes it. The EPP circuitry 50 then waits for data from the transponder 14, converts it to parallel, and transfers it to the hose computer 10. In one exemplary embodiment, messages include up to 64 bytes of data.

The EPP mode interface provides an asynchronous, interlocked, byte wide, bidirectional channel controlled by a host device. The EPP mode also allows the host computer to transfer, at high speed, a data byte to/from the interrogator within a single host computer CPU I/O cycle (typically 0.5 microseconds per byte).

Figure 3:
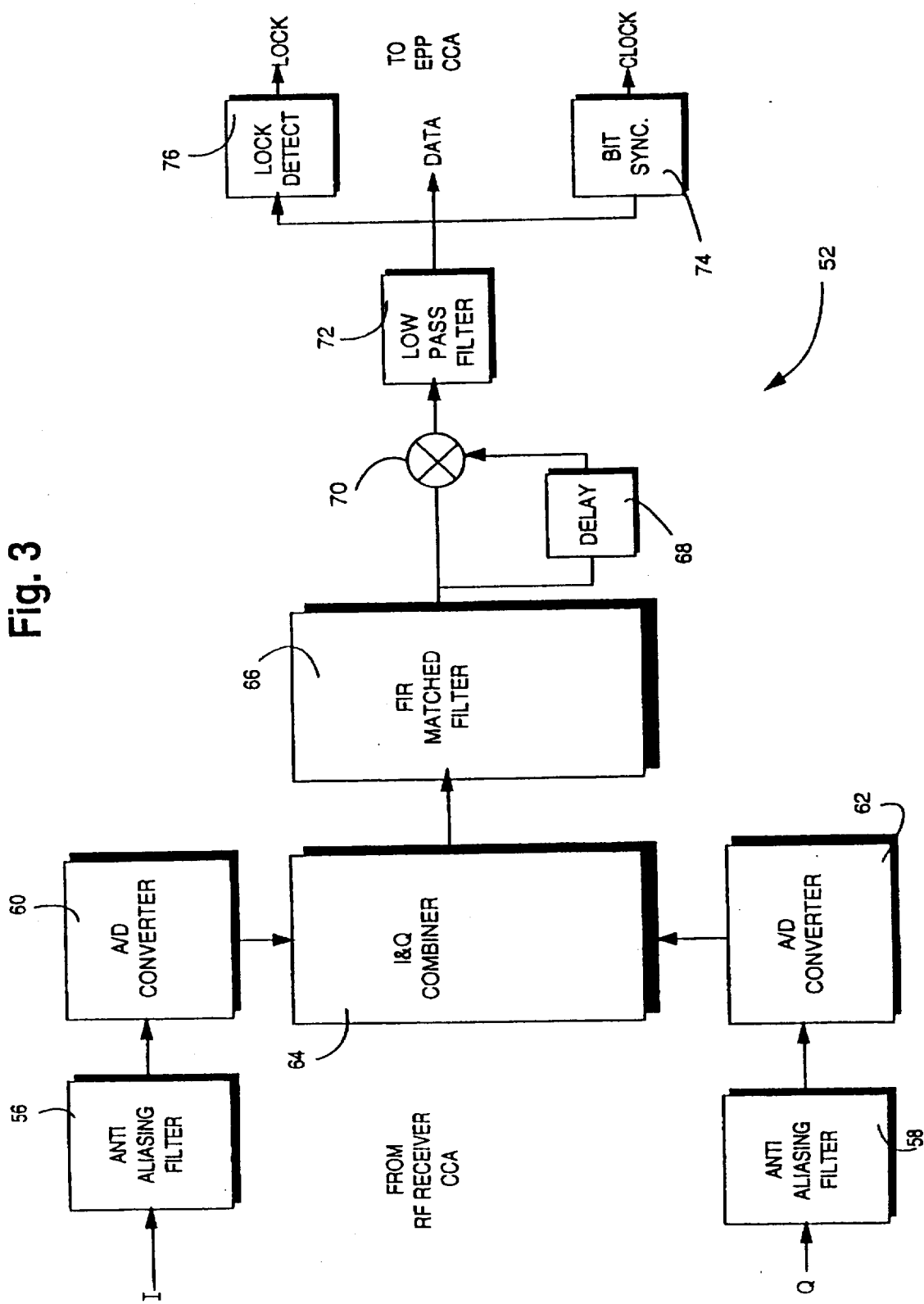
FIG. 3 is a more detailed illustration of the DPSK circuitry of FIG. 2.

The DPSK circuitry 52 of FIG. 3 receives signals I and Q from the RF circuitry 54 (described below), which signals contain the DPSK modulated sub-carrier. The DPSK circuitry 52 includes anti-aliasing filters 56 and 58 filtering the I and Q signals, respectively, and analog to digital (A/D) converters 60 and 62 respectively coupled to the filters 56 and 58 and respectively converting the filtered signals from analog to digital signals. The DPSK circuitry 52 further includes a combiner 64 coupled to the A/D converters 60 and 62, for combining the digital signals. The DPSK circuitry 52 still further includes a FIR matched filter 66, coupled to the combiner 64, which filters the combined signals. The DPSK circuitry 52 also includes delay circuitry 68 and multiplier circuitry 70 coupled to the FIR matched filter 66 for delaying the signal and multiplying the signal with the delayed signal to remove the sub-carrier. Moreover, the DPSK circuitry 52 further includes low pass filter circuitry 72, coupled to the multiplier 70, for filtering the output of the multiplier 70 to remove the 2 times the sub-carrier frequency component. The DPSK circuitry 52 further includes a bit synchronizer 74 coupled to the filter 72 for regeneration of the data clock as well as including lock detect circuitry 76 coupled to the low pass filter 72 and generating a lock detect signal. The data, clock, and lock detect signals are sent to the EPP circuitry 50.

Figure 4:
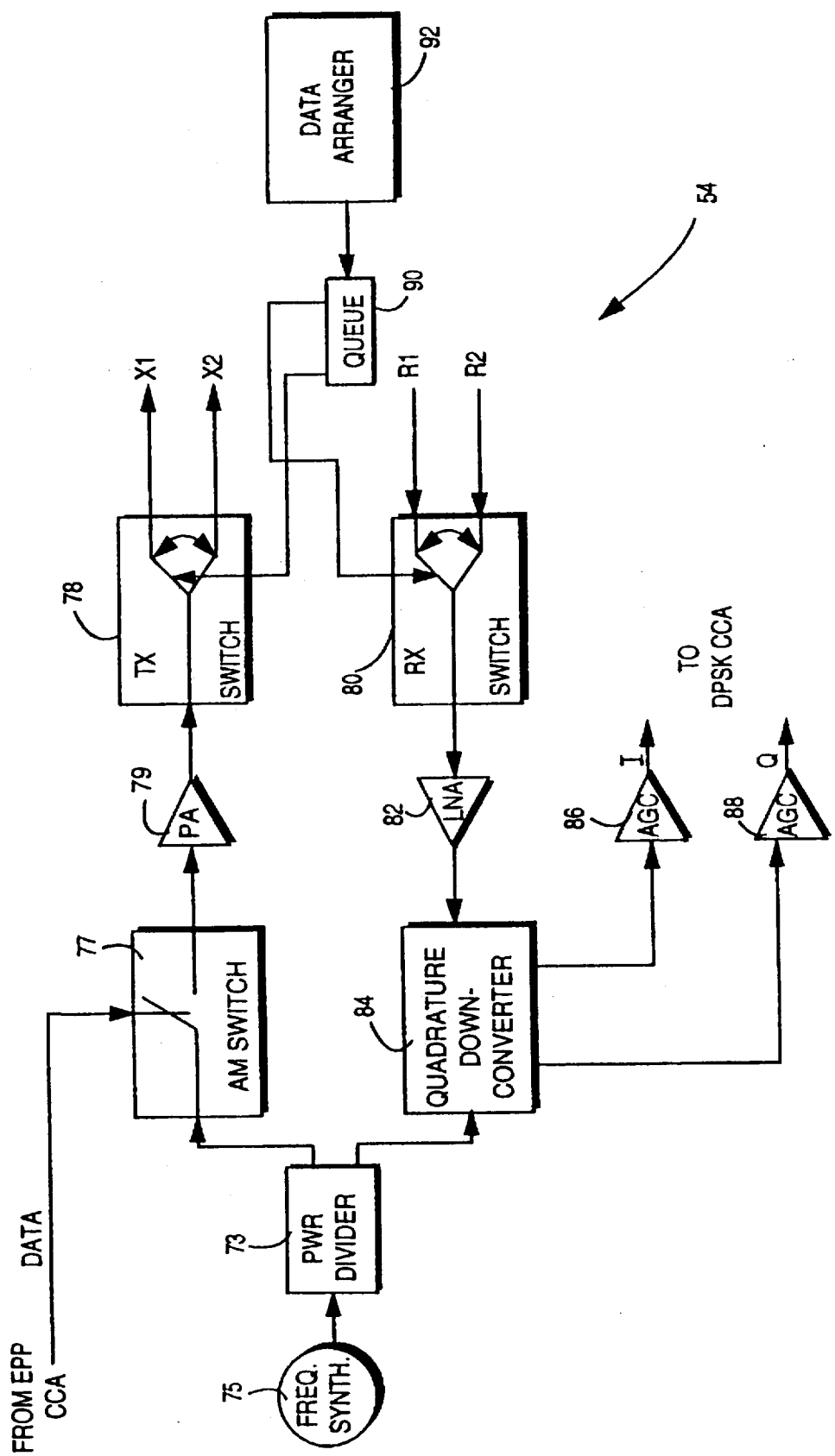
FIG. 4 is a more detailed illustration of the RF circuitry of FIG. 2.

The RF circuitry 54 of FIG. 4 interfaces with the transmit and receive antennas X1, X2, R1, and R2. Operationally, the RF circuitry modulates the data for transmission to a transponder 14, provides a continuous wave (CW) carrier for communications with the transponder, receives and downconverts the signal received from the transponder unit (which is a backscatter signal in one preferred embodiment).

The RF circuitry 54 also includes a power divider 73, and a frequency synthesizer 75 coupled to the power divider 73. The frequency synthesizer 75 tunes the RF continuous wave carrier for frequency hopping and band selection. The RF circuitry defines a transmitter, and receives data from the EPP circuitry 50. The RF circuitry 54 also includes an amplitude modulation (AM) switch 77 that receives the data from the EPP circuitry 50 and amplitude modulates the data onto a carrier. More particularly, the AM switch 77 turns the RF on and off (ON/OFF KEY). The RF circuitry 54 further includes a power amplifier 79, coupled to the AM switch 77, which amplifies the signal. Additionally included in the RF circuitry 54 is a diversity switch 78, coupled to the power amplifier 79, for transmission of the amplified signal through a selected one of the two transmit antennas X1 and X2. In an alternative embodiment, the switch 78 is coupled to more than two antennas and provides for switching from among the multiple antennas.

During continuous wave (CW) transmission for the backscatter mode, the AM switch 77 is left in a closed position. When the interrogator 26 is transmitting in the CW mode, the transponder backscatters the signal with a DPSK modulated sub carrier. This signal is received via one of the two diversity receive antennas R1 and R2. More particularly, the RF circuitry 54 further includes a diversity switch 80 coupled to the receive antennas R1 and R2. In an alternative embodiment, the switch 80 is coupled to more than two antennas and provides for switching from among the multiple antennas. In another alternative embodiment, such as when backscatter communications are not employed, the RF circuitry uses common antennas for both transmission and reception, and selects from multiple available send/receive antennas. The RF circuitry 54 further includes a low noise amplifier (LNA) 82 coupled to the switch 80 for amplifying the received signal. The RF circuitry 54 also includes a quadrature downconverter 84, coupled to the LNA 82, for coherently downconverting the received signal. The RF circuitry 54 still further includes automatic gain controls (AGCs) 86 and 88 coupled to the quadrature downconverter 84. The amplitude of the signals are set using the automatic gain controls 86 and 88 to provide the signals I and Q. The I and Q signals, which contain the DPSK modulated sub-carrier, are passed on to the DPSK circuitry 52 for demodulation.

The return link data from the transponder 14 is differential phase shift key (DPSK) modulated onto a 600 KHz subcarrier wherein 0 data corresponds to one phase and 1 data corresponds to another shifted 180° from the first phase.

As previously noted, the I and Q signals are lowpass filtered to prevent aliasing in the analog to digital converters and the subsequent digital circuitry. The filtered signals are sampled by the analog to digital converter and thereafter inputted to the quadrature combiner 64. In this regard, the quadrature combiner is implemented by delaying one of the channels a quarter sub-carrier cycle which is summed with the undelayed channel. Since DPSK modulation is used it will be noted that there is only a single frequency present in the sub-carrier. Thus, element 64 is a quadrature combiner at only a single frequency. Moreover, although the data modulation causes some spreading of the signal energy this relatively simple circuit closely approximates a quadrature combiner.

It will be noted that the quadrature combiner is important since in a backscatter communication system the phase of the incoming signal is unknown. Nevertheless performing an I and Q downconversion of the RF received signals ensures that the signal is recovered regardless of the phase of the signals.

In this regard however, it is impossible to predict whether the recovered signal will appear on the I or Q output or some combination of the two. Moreover, it is equally impossible to predict whether the I and Q channel signals will be in phase or out of phase with one another. By using the above-noted quadrature combiner these uncertainties no longer matter. That is to say, the output will be the same amplitude regardless of whether the signal is entirely on the I or Q channel or any combination of the two.

Figure 5:
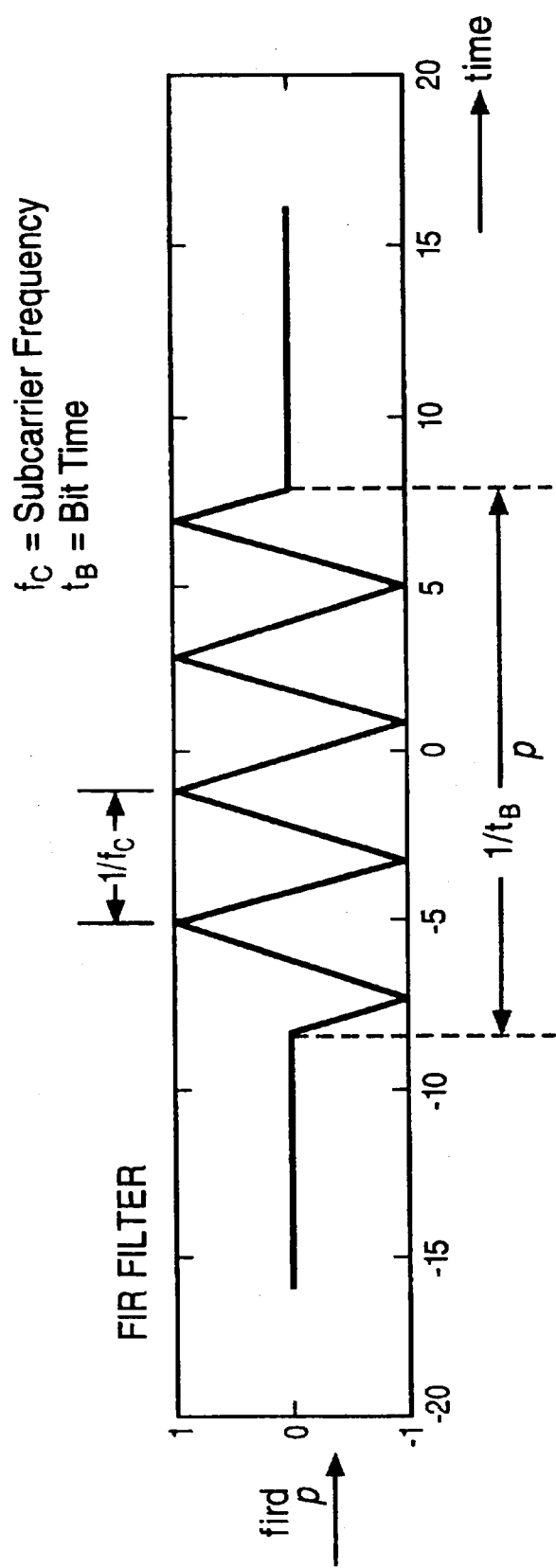
FIG. 5 is an illustration of the square envelope of the data and tap values of the FIR matched filter.
Figure 6:
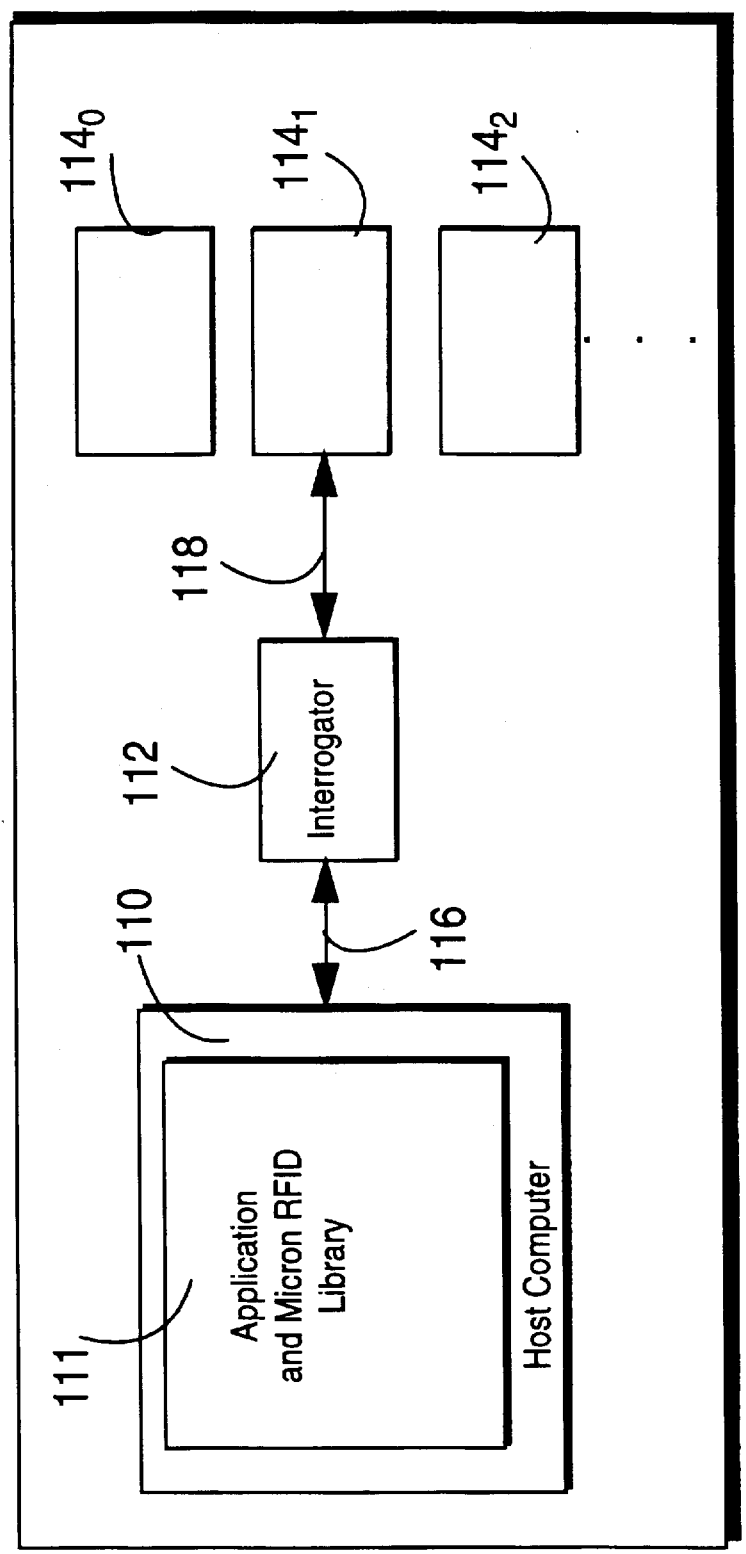
FIG. 6 is a simplified block diagram of a remote communications system for communicating selectively with particular remote intelligent communication devices.
Figure 7:
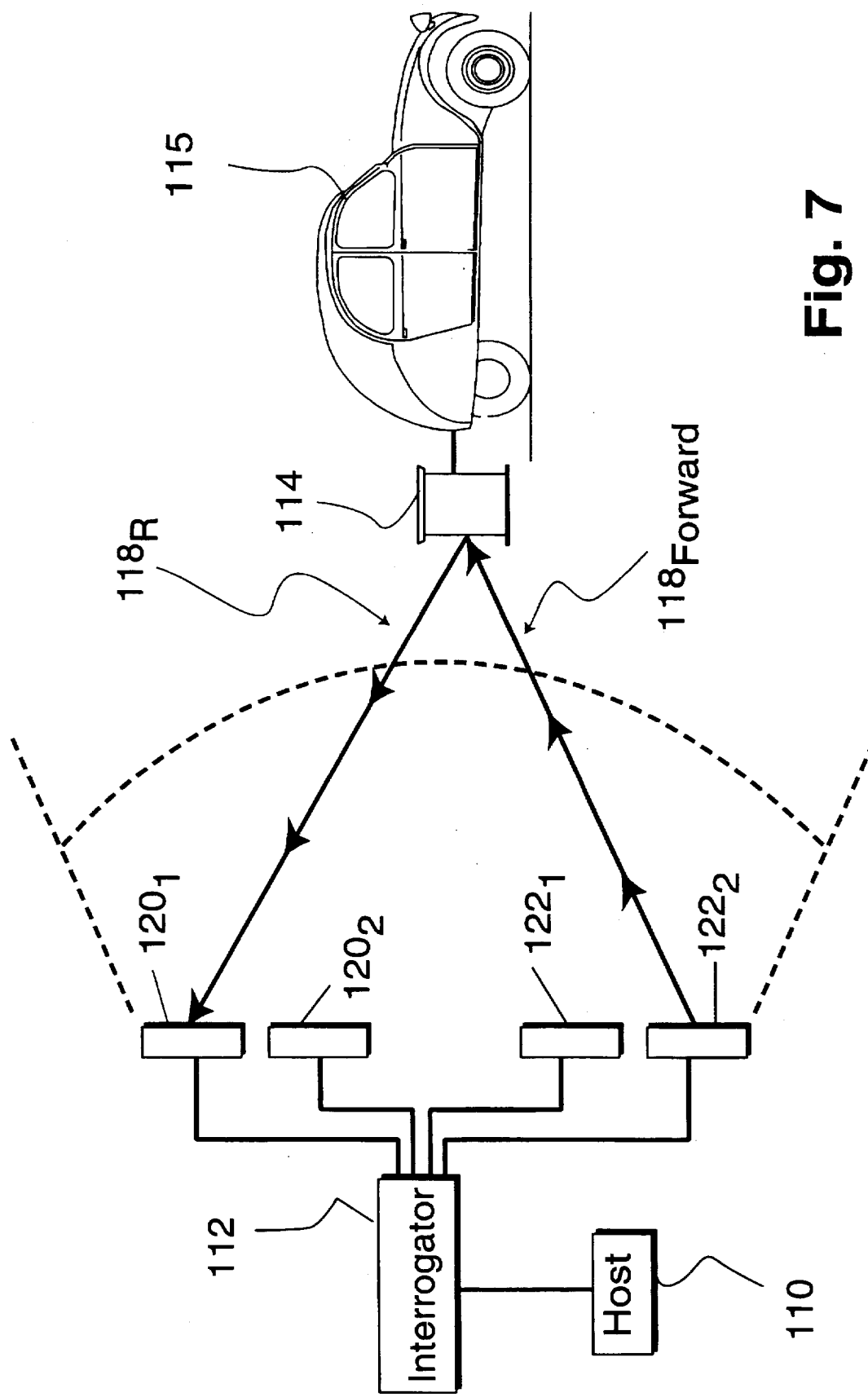
FIG. 7 is a block diagram illustrating forward and return communication links with a remote intelligent communications device as employed within a given remote communications system.
Figure 8:
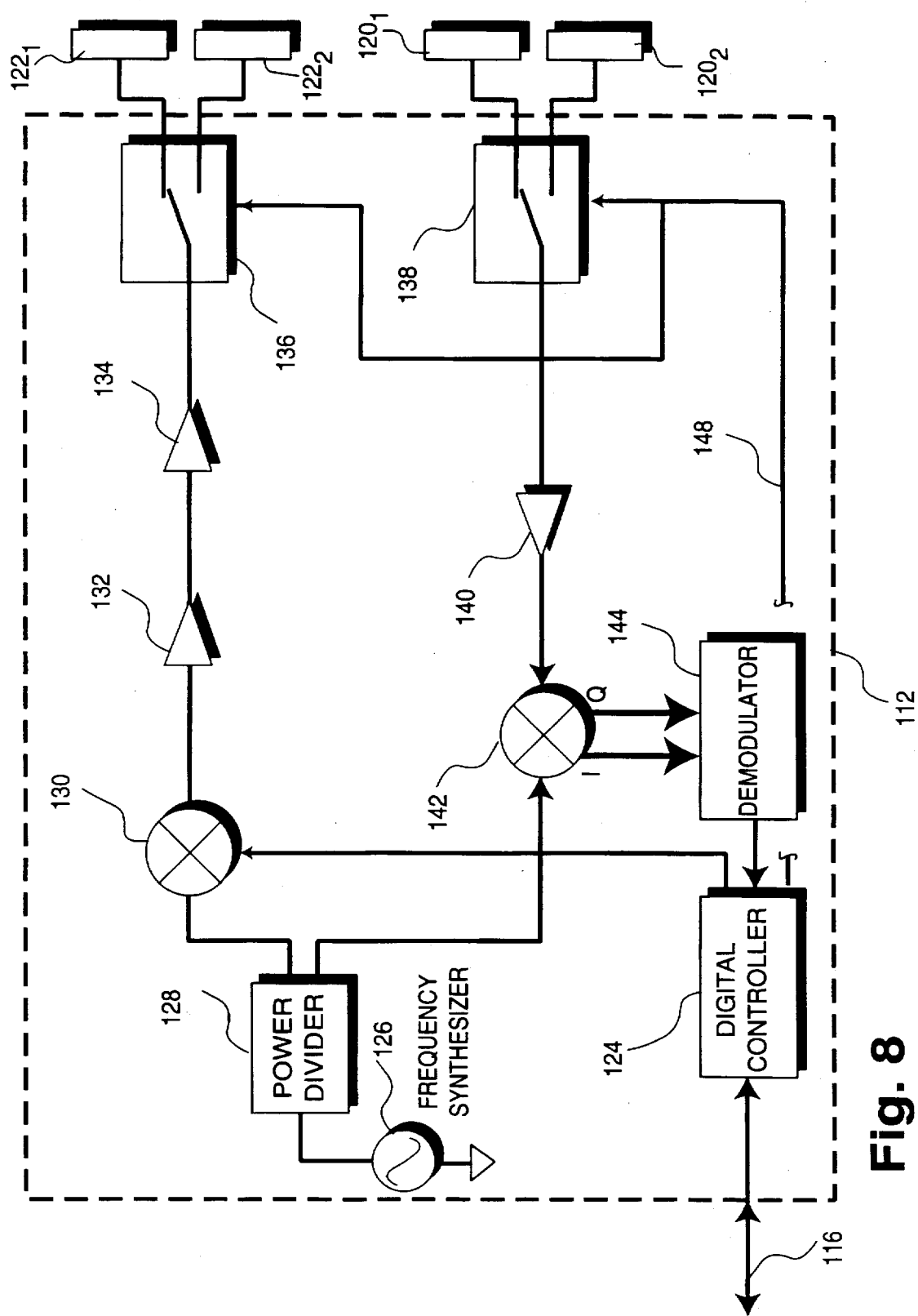
FIG. 8 is a simplified block diagram of an interrogator.
Figure 9:
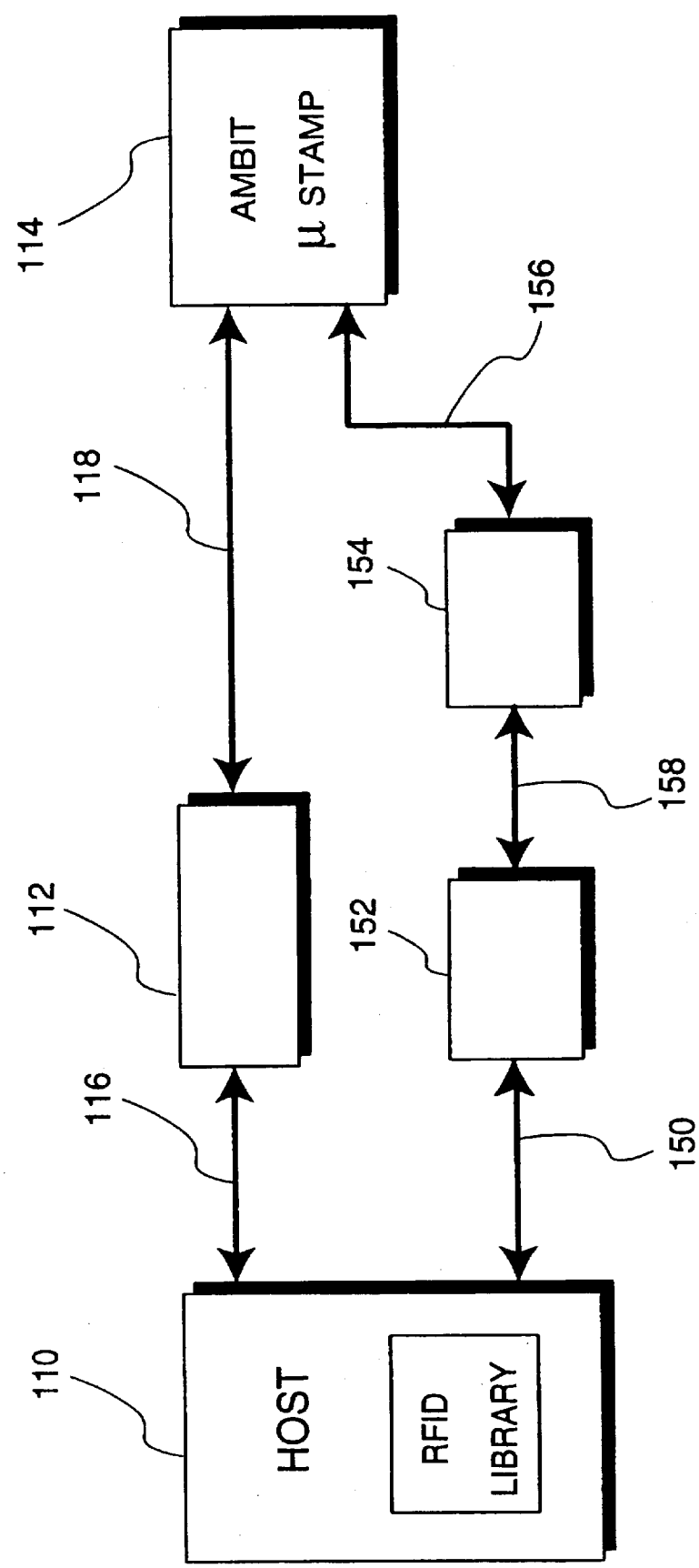
FIG. 9 is a block diagram of a remote communications system in accordance with one embodiment of the present invention.
Figure 10:
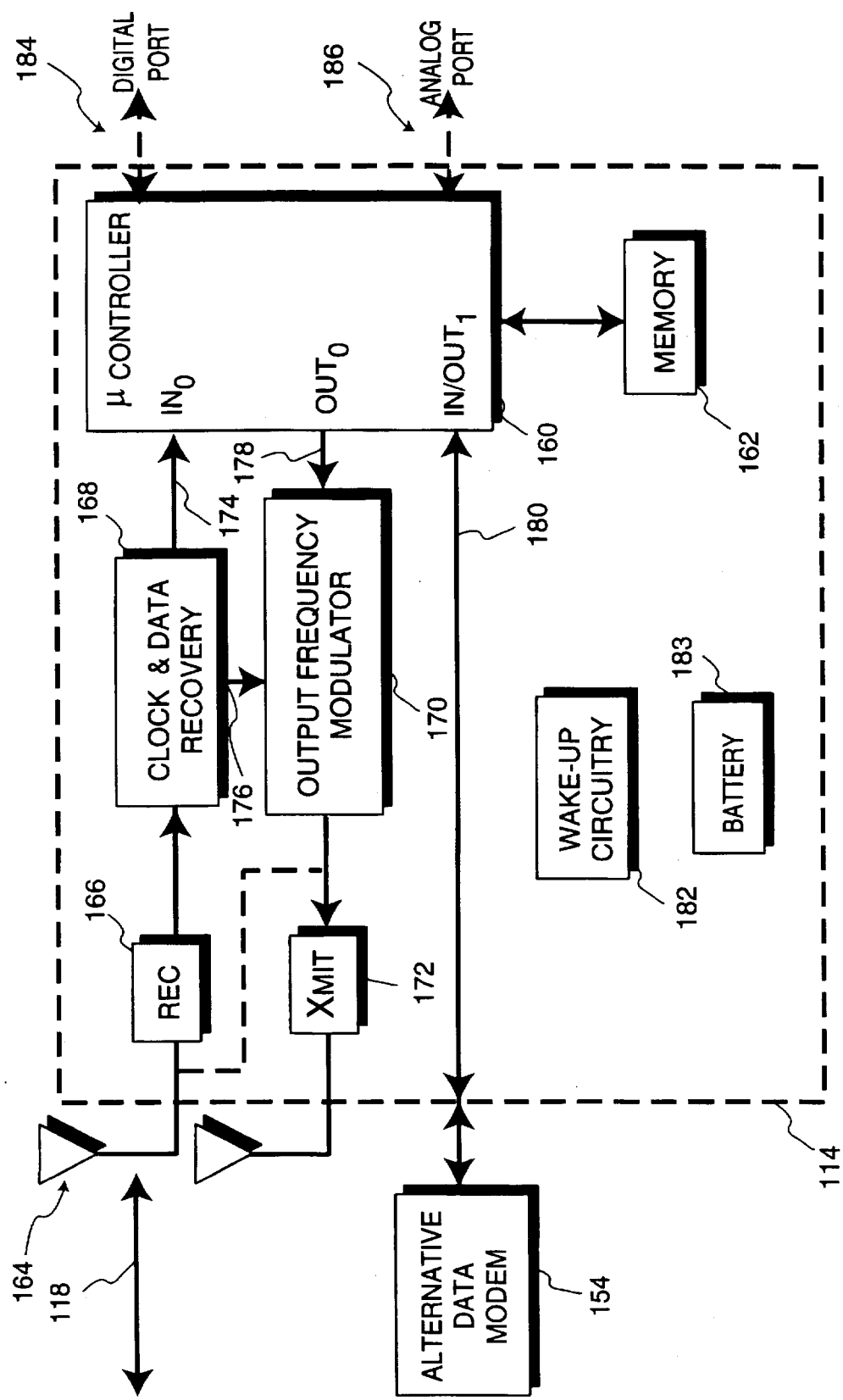
FIG. 10 is block diagram of a remote intelligent communications device integrated with an alternative communication channel in accordance with a particular embodiment of the present invention.

Thereafter, this single signal is processed through a FIR matched filter. Since the data is square in time, the ideal matched filter having the characteristics illustrated in FIG. 5 is one with a square time envelope and taps at the sub-carrier frequency. Due to the square envelope of the data, the tap values are all the same magnitude, namely, +1 or −1. Such characteristics simplify the implementation of the matched filter to merely inverting or not inverting the sign bit and then doing a summation.

As an additional feature since the data is differentially phase shift keyed on a sub-carrier, demodulation can be obtained using a simple delay and multiply scheme as noted above. Thus, if the current bit is of the same phase as the preceding bit, a positive DC value will appear at the multiplier output. On the other hand, if the phase of the current bit is opposite to that of the previous bit, a negative value will appear at the multiplier output. Still further, since the multiplier also generates a 2 times the sub-carrier frequency signal, a low pass filter is used to remove the undesired signal. Thereafter, the demodulated output data is input to bit synchronizer 74, wherein the data clock is recovered.

Further details of the above noted bit synchronizer can be found in our co-pending commonly assigned application Ser. No. 08/781,884, filed Dec. 21, 1996 which is hereby incorporated by reference in its entirety.

While the invention has been described in what is presently considered to be the most practical and preferred embodiments, it is understood that the appended claims are not to be limited to the disclosed embodiments, but on the contrary, are intended to cover modifications, variations and/or equivalent arrangements which would retain any of the novel features and advantages of the invention.

What is claimed is:

1. A differential phase shift keyed demodulator which utilizes quadrature input signals that are supplied to and converted to quadrature digital outputs by analog to digital converters, comprising:

a quadrature combiner responsive to the quadrature digital outputs for combining said outputs, wherein one of the quadrature digital outputs is delayed with respect to another undelayed output, and wherein the delayed and undelayed quadrature digital outputs are summed to produce combined output signals;

a finite impulse response matched filter coupled to the quadrature combiner for filtering the combined output signals; and a time delay and multiplier circuit wherein a current filtered combined output signal is multiplied by a delayed filtered combined output signal to produce a demodulated output signal.

2. A demodulator as in claim 1 wherein the quadrature input signals are differentially phase shift keyed onto a single frequency sub-carrier.

3. A demodulator as in claim 1 wherein the FIR matched filter has a square time envelope.

4. A demodulator as in claim 2 wherein the FIR matched filter has a square time envelope and taps at the sub-carrier frequency.

5. A demodulator as in claim 2 wherein the multiplier circuit generates a two times the sub-carrier frequency signal.

6. A demodulator as in claim 5 further including a low pass filter responsive to the multiplier circuit for removing the two times the sub-carrier frequency signal.

7. A demodulator as in claim 1 further including a synchronization circuit of recovering a data clock from the demodulated output signal.

8. In a remote intelligent communication system including a programmable computer and a plurality of remote communication devices connected to the computer via an interrogator and a communications medium, said interrogator including a differential phase shift keyed demodulator which utilizes quadrature input signals that are supplied to and converted to quadrature digital outputs by analog to digital converters, a differential phase shift keyed demodulator comprising:

a quadrature combiner responsive to the quadrature digital outputs for combining said outputs, wherein one of the quadrature digital outputs is delayed with respect to another undelayed output, and wherein the delayed and undelayed quadrature digital outputs are summed to produce combined output signals;

a finite impulse response matched filter coupled to the quadrature combiner for filtering the combined output signals, and a time delay and multiplier circuit wherein a current filtered combined output signal is multiplied by a delayed filtered combined output signal to produce a demodulated output signal.

9. A system as in claim 8 wherein the remote communication devices are transducers which produce backscatter signals and the system further includes a downconverter for producing said quadrature input signals.

10. A system as in claim 9 wherein the quadrature input signals are differentially phase shift keyed onto a single frequency sub-carrier.

11. A system as in claim 9 wherein the quadrature input signals are filtered prior to being input to the analog to digital converters.

12. A system as in claim 8 wherein the FIR matched filter has a square time envelope.

13. A system as in claim 9 wherein the FIR matched filter has a square time envelope and has taps at the sub-carrier frequency.

14. A system as in claim 9 wherein the multiplier circuit generates a two times the sub-carrier frequency signal.

15. A system as in claim 14 further including a low pass filter responsive to the multiplier circuit for removing the two times the sub-carrier frequency signal.

16. A system as in claim 8 further including a synchronization circuit for recovering a data clock from the demodulated output signal.

* * * * *

UNITED STATES PATENT AND TRADEMARK OFFICE
CERTIFICATE OF CORRECTION

PATENT NO. : 5,896,060
DATED : April 20, 1999
INVENTOR(S) : OVARD et al

It is certified that error appears in the above-identified patent and that said Letters Patent is hereby corrected as shown below:

Column 2, line 29, change "$118_1$," to --$118_{Forward}$--.

Column 2, line 33, change "$118_r$," to --$118_R$--.

Column 5, line 57, change "186" to --182--.

Column 5, line 65, change "104" to --1104--.

Column 7, line 37, change "186" to --$186_1$--.

Column 7, line 40, change "186" to --$186_1$--.

Column 8, line 27, change "1110" to --110--.

Column 8, line 31, change "110" to --1110--.

Column 8, line 58, change "in" to --it--.

Column 10, line 29, change "26" to --25--.

Column 10, line 38, change "hose" to --host--.

Column 10, line 39, change "48" to --10--.

Column 10, line 45, change "hose" to --host--.

Figure 11:
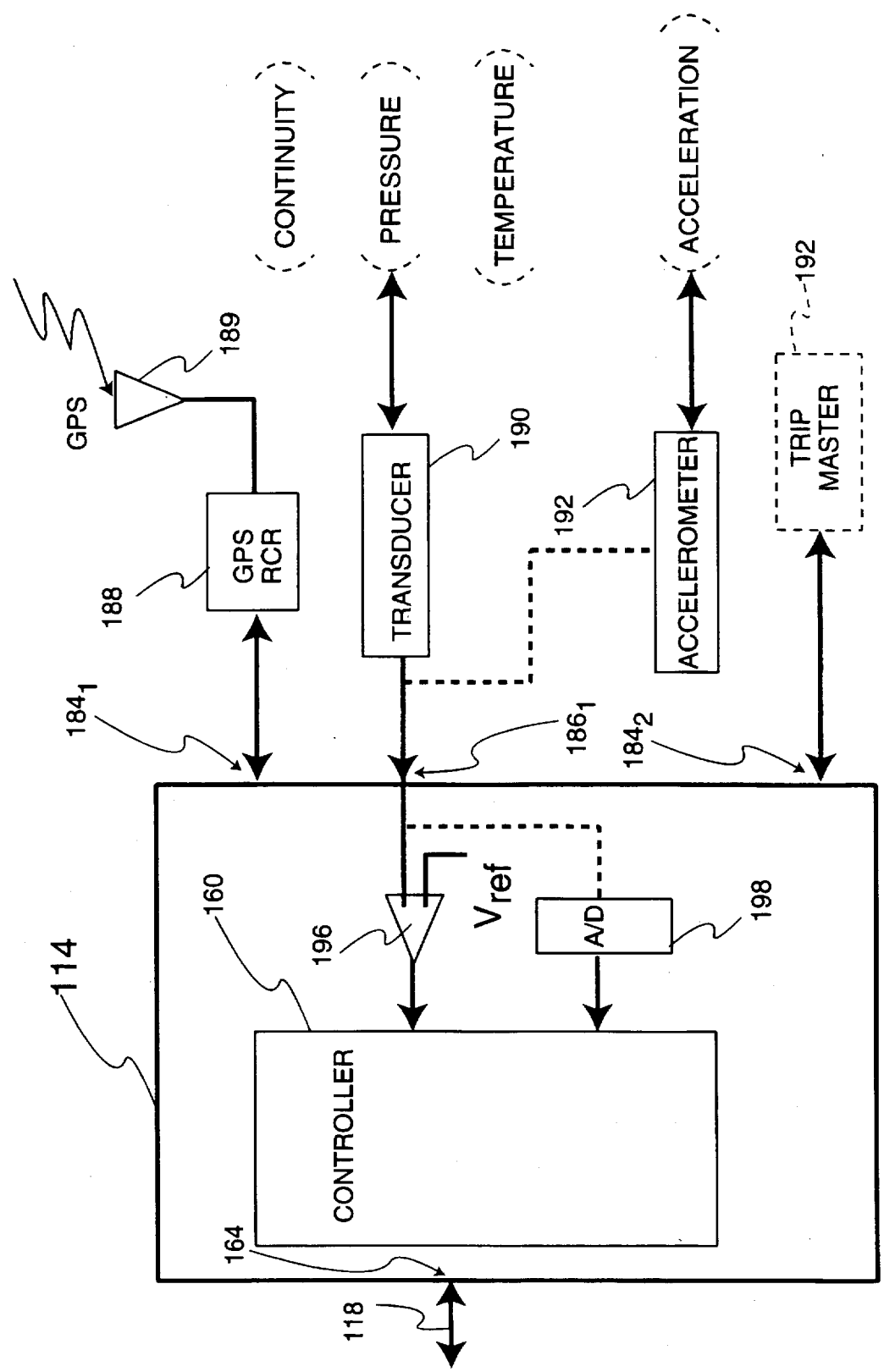
FIG. 11 is a block diagram of a remote intelligent communications device for monitoring various attributes of a remote object in accordance with various exemplary embodiments of the present invention.
Figure 12:
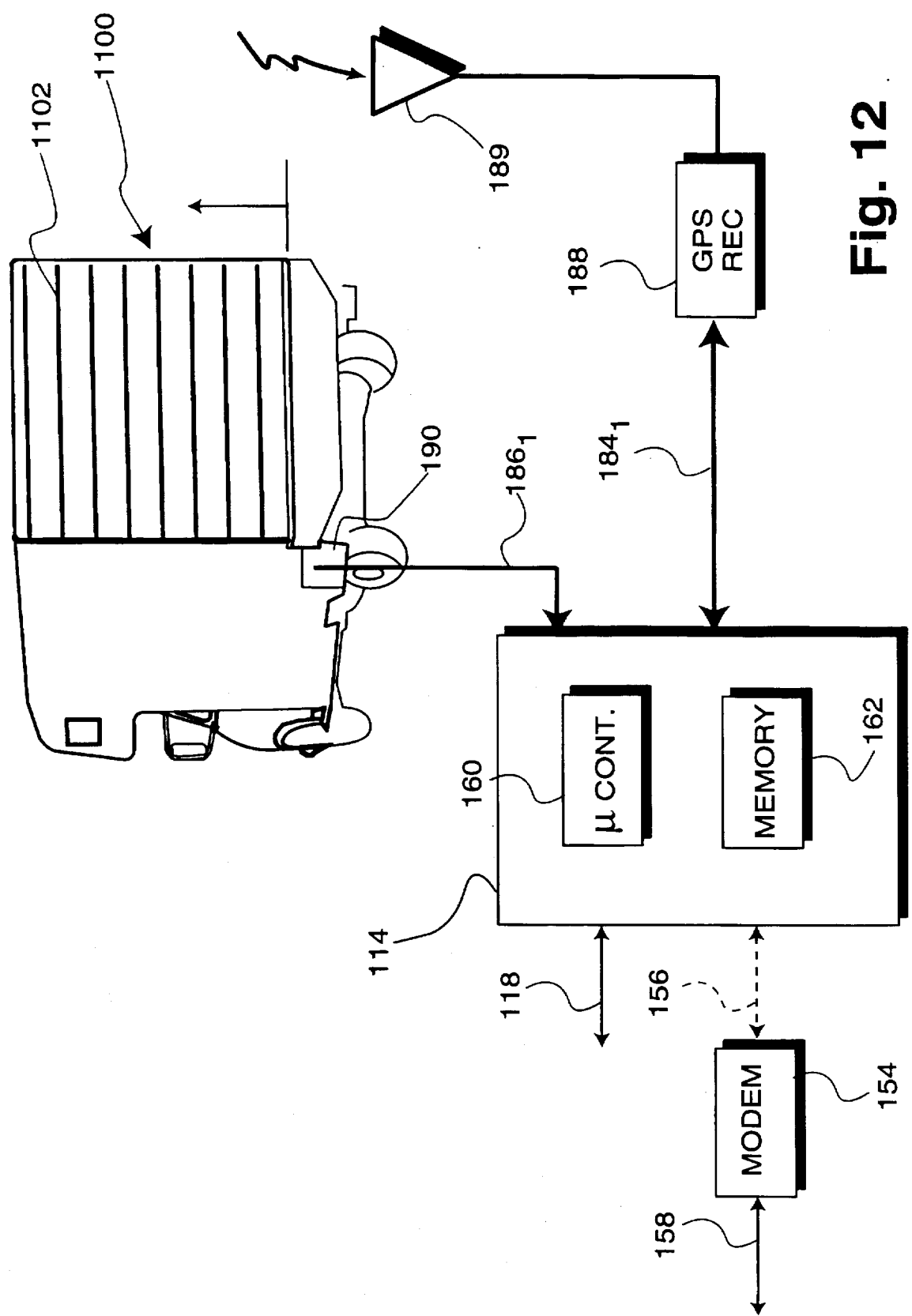
FIG. 12 is a block diagram of a remote intelligent communications device incorporated with a cargo bay of a delivery vehicle for monitoring a given condition thereof in accordance with another exemplary embodiment of the present invention.
Figure 13:
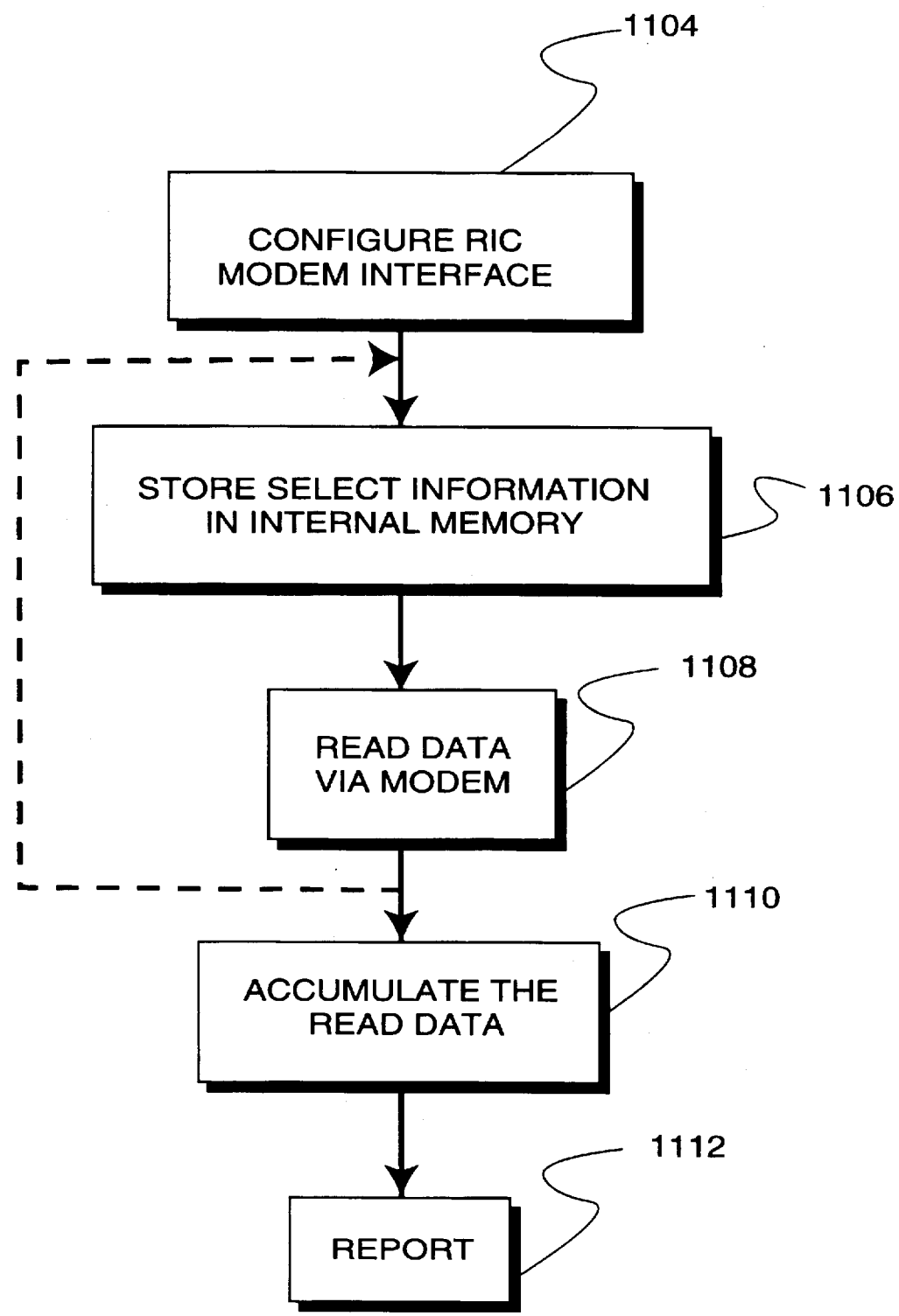
FIG. 13 is a high level flow chart characterizing a general method for operating a remote intelligent communications device in accordance with a particular embodiment of the present invention.

In FIG. 11, Drawing Sheet 11 of 13, the reference numeral (referred to at column 7, line 16) attached to the dashed "trip master" box in the lower right hand corner of the figure should be changed from "192" to --194--, as shown below:

UNITED STATES PATENT AND TRADEMARK OFFICE
CERTIFICATE OF CORRECTION

PATENT NO. : 5,896,060
DATED : April 20, 1999
INVENTOR(S) : OVARD et al

It is certified that error appears in the above-identified patent and that said Letters Patent is hereby corrected as shown below:

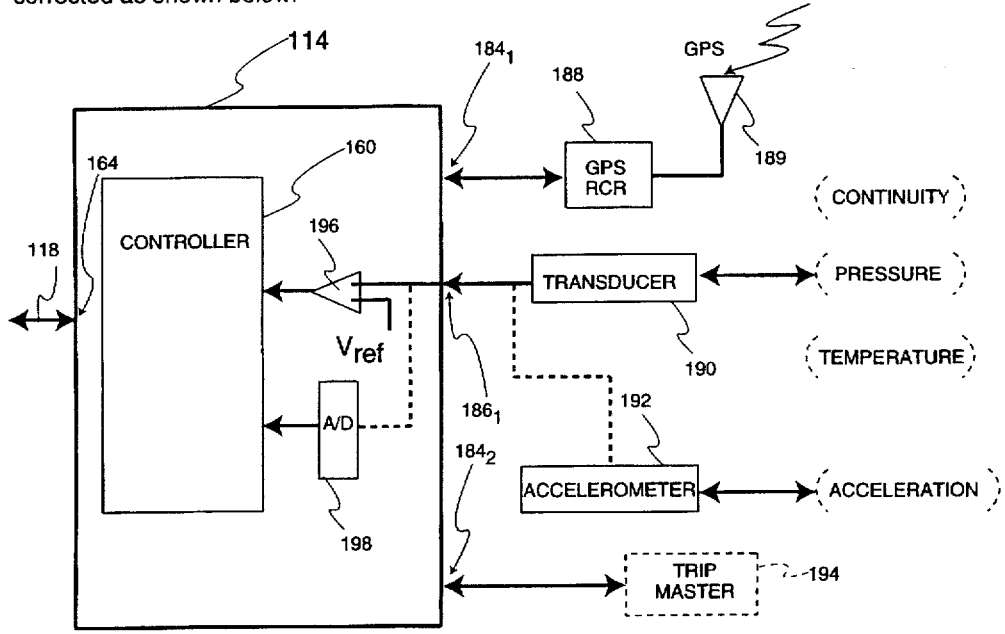

Fig. 11

Signed and Sealed this

Twenty-first Day of December, 1999

Attest:

Q. TODD DICKINSON

Attesting Officer

Acting Commissioner of Patents and Trademarks